(12) United States Patent
Gabriel et al.

(10) Patent No.: US 12,078,264 B2
(45) Date of Patent: Sep. 3, 2024

(54) ANTI-CAVITATION CAGE FOR VALVE ASSEMBLY AND METHOD OF MANUFACTURE

(71) Applicant: FISHER CONTROLS INTERNATIONAL LLC, Marshalltown, IA (US)

(72) Inventors: Thomas N. Gabriel, Marshalltown, IA (US); Shannon E. Jelken, Marshalltown, IA (US); Katherine N. Bartels, Ames, IA (US); Julian. A. Mann, Ames, IA (US); Lawrence Martin, Marshalltown, IA (US); Luke A. Novak, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 17/332,560

(22) Filed: May 27, 2021

(65) Prior Publication Data

US 2022/0381367 A1 Dec. 1, 2022

(51) Int. Cl.
*F16K 47/08* (2006.01)
*B22F 10/28* (2021.01)
*F16K 3/24* (2006.01)
*B33Y 10/00* (2015.01)
*B33Y 80/00* (2015.01)

(52) U.S. Cl.
CPC .............. *F16K 47/08* (2013.01); *B22F 10/28* (2021.01); *F16K 3/246* (2013.01); *B33Y 10/00* (2014.12); *B33Y 80/00* (2014.12)

(58) Field of Classification Search
CPC .......... F16K 47/08; F16K 3/246; B22F 10/28; B33Y 10/00; B33Y 80/00
See application file for complete search history.

(56) References Cited

U.S. PATENT DOCUMENTS

| 2,918,087 | A | * | 12/1959 | Curran | F16K 25/04 251/118 |
| 3,821,968 | A | * | 7/1974 | Barb | F16K 47/04 251/210 |
| 4,024,891 | A | * | 5/1977 | Engel | F16K 47/08 137/625.3 |
| 4,429,714 | A | * | 2/1984 | Hughes | F16K 47/08 138/41 |
| 4,971,099 | A | * | 11/1990 | Cyvas | E21B 43/20 137/454.2 |
| 6,000,433 | A | * | 12/1999 | Carroll | B01D 46/10 138/44 |
| 6,926,032 | B2 | * | 8/2005 | Nawaz | F16K 47/08 137/625.33 |

(Continued)

*Primary Examiner* — Craig M Schneider
*Assistant Examiner* — Christopher D Ballman
(74) *Attorney, Agent, or Firm* — MARSHALL, GERSTEIN & BORUN LLP (57) ABSTRACT

An anti-cavitation cage for a valve assembly. The anti-cavitation cage includes a body having a plurality of slots, a first end, and a second end. At least one slot of the plurality of slots includes an inside surface having a lattice structure. The lattice structure is one of uniform in grade through the at least one slot or a graded type of lattice structure varying in density from a first portion to a second portion. The anti-cavitation cage having these features is a single component.

9 Claims, 9 Drawing Sheets

(56) References Cited

U.S. PATENT DOCUMENTS

| | | | | |
|---|---|---|---|---|
| 6,973,941 | B2* | 12/2005 | Baumann | F16K 3/267 |
| | | | | 137/625.37 |
| 8,740,179 | B2* | 6/2014 | Griffin, Jr. | F16K 47/08 |
| | | | | 251/360 |
| 9,587,764 | B2* | 3/2017 | Juhnke | F16K 3/24 |
| 9,885,375 | B2* | 2/2018 | Reiss | F15D 1/025 |
| 10,215,306 | B2* | 2/2019 | Braeuer | F16K 47/08 |
| 10,359,128 | B2* | 7/2019 | Griffin, Jr. | F16K 47/08 |
| 10,487,961 | B2* | 11/2019 | Eilers | B33Y 80/00 |
| 11,353,139 | B1* | 6/2022 | Mann, III | F16K 3/26 |
| 2010/0288389 | A1* | 11/2010 | Hopper | F16K 25/04 |
| | | | | 138/46 |
| 2010/0300554 | A1* | 12/2010 | Howes | F16K 15/14 |
| | | | | 137/511 |
| 2017/0138507 | A1* | 5/2017 | Kluz | F16K 47/08 |

\* cited by examiner

FLOW

ANTI-CAVITATION CAGE FOR VALVE ASSEMBLY AND METHOD OF MANUFACTURE

TECHNICAL FIELD

The present disclosure relates to anti-cavitation and noise attenuation devices and, more specifically, to a single piece anti-cavitation cage for a valve assembly and a method of additively manufacturing the same.

BACKGROUND

Generally, cavitation is the formation and subsequent collapse of vapor bubbles in liquid flow streams and is a major source of damage in control valves and adjacent piping. To reduce or minimize such damage, there are many known anti-cavitation devices and noise reducing devices. Some of the devices include both anti-cavitation and noise reducing features combined. One exemplary anti-cavitation device includes an Emerson Cavitrol III family, which includes a broad range of options ranging from 1-stage, 2-stage, 3-stage, 4-stage, and 5-stage devices. In addition, the devices in the Cavitrol III family are all designed for "flow-down" applications.

Figure 1A:
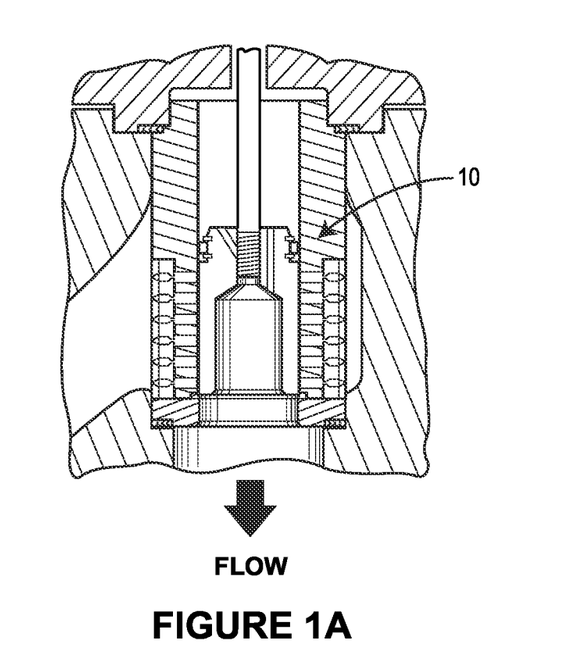
FIG. 1A is a conventional anti-cavitation device disposed within a valve assembly, the conventional anti-cavitation device including multiple components.

For example, and referring now to FIG. 1A, a sectional view of an exemplary 3-stage anti-cavitation device 10 in the Cavitrol III family is depicted as having a "flow-down" orientation and application. During operation, various pressure drop patterns occur as fluid travels through the valve stages.

Figure 1B:
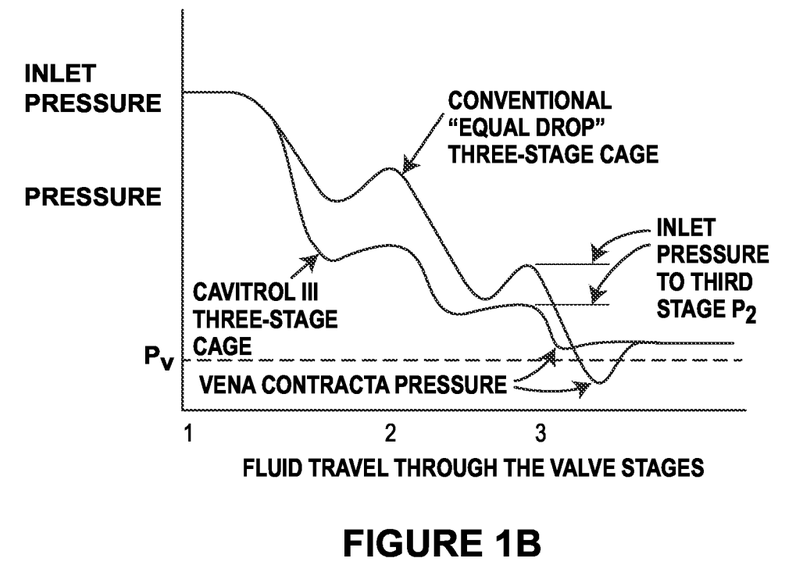
FIG. 1B is graph depicting operation of the anti-cavitation device of FIG. 1A.

Specifically, and referring to FIG. 1B, as liquid passes through a restriction in a control valve, the liquid velocity increases while the liquid pressure decreases. The pressure reaches a minimum at a point called the vena contracta, and if the pressure at this point falls to or below the vapor pressure of the liquid (the pressure at which the liquid vaporizes), vapor bubbles form in the flow stream. Downstream of the vena contracta, flow area increases, velocity decreases, and pressure increases, as depicted in FIG. 1B. If this recovered pressure if sufficient to raise the pressure above the liquid vapor pressure, the vapor bubbles will collapse. The collapsing bubbles generate a significant noise and vibration and can mechanically attack pipe walls and valve components. This attack may lead to the failure of conventional valve components, particularly a valve plug and a valve seat ring.

Figure 2A:
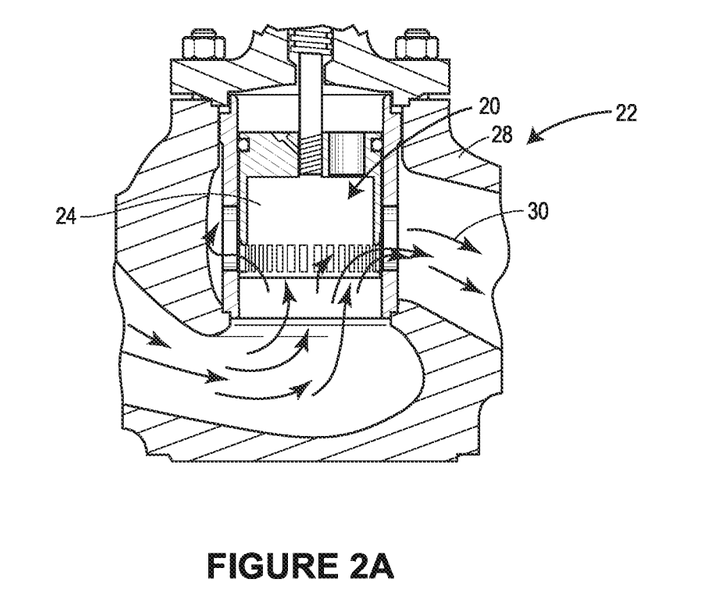
FIG. 2A is a conventional noise reducing device disposed within a valve assembly, the conventional noise reducing device including multiple components.

Referring now to FIG. 2A, a conventional noise reducing device 20 is depicted disposed within a control valve 22. In one example, the conventional noise reducing device 20 is an Emerson Whisper Trim I cage device. The noise reducing device 20 includes a cage 24 and offers proven aerodynamic noise control that is effective for vapor, gas, or stream flow applications. As depicted in FIG. 2A, the noise reducing device 20 is designed to operate in a "flow up" configuration.

Figure 2B:
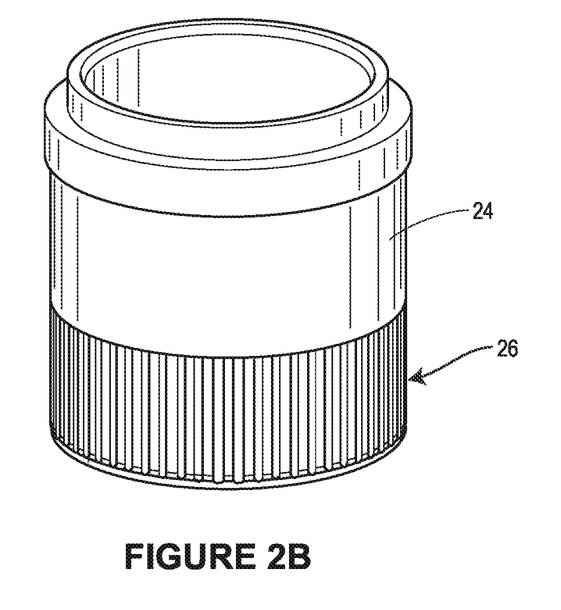
FIG. 2B is a conventional noise reducing device for use with the valve assembly of FIG. 2A.

More specifically, and as depicted in FIG. 2B, the noise reducing device 20 lowers noise of the valve 22 by utilizing multiple orifices 26 of special shape, size, and spacing. The orifices 26 break up turbulent fluid streams, reducing noise-producing interactions. The trim 28 (FIG. 2A) shifts acoustic energy to higher frequencies that are not readily absorbed by downstream piping. At high frequencies, the piping radiates much less sound in the audible range, which also helps to reduce strain energy and combat piping fatigue. The exit jets 30 from the trim 28 are essentially parallel, which avoids shock cell interaction of the outlet jets that could cause turbulence and noise.

Typical anti-cavitation and noise reducing devices require complex manufacturing processes. This is generally due to the complex shapes that are required for the specific applications, as explained in part above. Any times, these components/devices require multiple pieces to achieve the final component or product. For example, the noise reducing device 20 is currently manufactured using investment cast process, a complex manufacturing process. In addition, due to the complexity in investment cast molds, finished noise reducing devices are often inconsistent with each other, impacting how the device performs, for example.

SUMMARY

In accordance with a first exemplary aspect, an anti-cavitation cage for a valve assembly is disclosed. The anti-cavitation cage comprises a body having a plurality of slots, a first end, and a second end. At least one slot of the plurality of slots includes an inside surface having a lattice structure. The lattice structure is one of uniform in grade through the at least one slot or a graded type varying in density from a first portion to a second portion. In addition, the anti-cavitation cage is a single component.

In accordance with another exemplary aspect of the present disclosure, a method of manufacturing an anti-cavitation cage for a valve assembly is disclosed. The method comprises forming a single component body using at least one additive manufacturing technique and forming a plurality of slots in the body using at least one additive manufacturing technique. The method further comprises forming a lattice structure in an inside surface of at least one slot of the plurality of slots using an additive manufacturing technique. The lattice structure is one of uniform in grade through the at least one slot or a graded type varying in density from a first portion to a second portion.

In further accordance with any one of the foregoing exemplary aspects, the anti-cavitation cage and/or methods of manufacturing the anti-cavitation cage may further include any one or more of the following preferred forms.

In some preferred forms, the anti-cavitation cage may further comprise a longitudinal axis, and the at least one slot of the plurality of slots may be disposed one of: vertically along a longitudinal axis of the anti-cavitation cage; at an angle from the longitudinal axis of the anti-cavitation cage; or horizontally from the longitudinal axis of the anti-cavitation cage. The orientation of the at least one slot is adapted to achieve different flow characteristics.

In another form, the plurality of slots may have a plurality of rows including a first row disposed near the first end, a second row disposed adjacent to the first row and closer to the second end than the first row, and a third row disposed adjacent to the second row and closer to the second end than the first and second rows. A height of the slots in each of the first, second, and third rows may increase in size from the first row to the third row.

In yet another form, the height of the slots in the first row may be H, the height of the slots in the second row may be 1.5H, and the height of the slots in the third row may be 2H.

In still another form, the height of the slots of the plurality of slots may increase in size from the first end to the second end of the cage.

In yet another form, the anti-cavitation cage may include a plurality of windows disposed at the second end of the cage. In addition, at least one window may include any one or more of a rectangular shape, a partially rectangular shape, or a quick open shape.

In another form, at least one slot of the plurality of slots may include one or more of an oval shaped, an elongated oval shape, or a rounded shape. Further, the shape of the at least one slot may be one or more of: (1) increasing capacity for a maximum flow area through a passageway of the cage; or (2) specific to noise attenuation.

In still another form, the lattice structure may comprise a triply periodic structure comprising a plurality of round struts, the plurality of round struts to aid in flow performance and pressure staging.

In another form, the graded type of lattice structure may vary in density from a first portion to a second portion and may be for managing multiple pressure drops through a flow passageway of the valve assembly.

In still another form, a height of the at least one slot of the plurality of slots may increase along a portion of the length of the cage from the first end to the second end of the cage. In addition, a density of the lattice structure of the slots may decrease from the first end to the second end of the cage.

Further the anti-cavitation cage may be formed of a single component by at least one additive manufacturing technique, and the at least one additive manufacturing technique may comprise a powder bed fusion process.

In a preferred method, the powder bed fusion process may include spreading a first layer of powder over a build platform, fusing the first layer, spreading a new layer of powder across the first layer using a recoat mechanism, fusing the new layer, and repeating the process of adding and fusing one or more further layers of powder until the single component body is created.

In another preferred method, the method may further comprise removing any loose, unfused powder remaining in position after the powder bed fusion process and the single component body is created.

In yet another method, the method may further comprise reversing a flow orientation of the body of the anti-cavitation cage from a flow-down orientation to include an option for a flow-up orientation.

In still another method, forming a plurality of slots in the body using at least one additive manufacturing technique may comprise forming the plurality of slots including a plurality of rows having a first row disposed near a first end of the body, a second row disposed adjacent to the first row and closer to a second end of the body than the first row, and a third row disposed adjacent to the second row and closer to the second end than the first and second rows. In addition, a height of the slots in each of the first, second, and third rows may increase in size from the first end to the second end of the body or the height of the slots in the first row may be H, the height of the slots in the second row may be 1.5H, and the height of the slots in the third row may be 2.0H.

In yet another method, forming a lattice structure in an inside surface of at least one slot of the plurality of slots using at least one additive manufacturing technique may comprise forming a lattice structure having a triply periodic structure having a plurality of round struts, the round struts aiding in flow performance and pressure staging.

In another method, forming a plurality of slots in the body and a lattice structure in an inside surface of at least one slot of the plurality of slots using at least one additive manufacturing technique may comprise increasing a height of the at least one slot along a portion of a length of the body from a first end to a second end of the body and decreasing a density of the lattice structure along the portion of the length of the body from the first end to the second end.

In yet another preferred method, the method may further comprise forming a plurality of windows near a second end of a body using at least one additive manufacturing technique, wherein at least one window of the plurality of windows may include any one or more of a rectangular shape, a partially rectangular shape or a quick open shape.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, and in which:

DETAILED DESCRIPTION

A single piece anti-cavitation cage is disclosed and formed by additive manufacturing techniques. In particular, the single piece anti-cavitation cage of the present disclosure is formed using a laser powder bed fusion additive manufacturing process, as described more below. In this way, the anti-cavitation cage of the present disclosure is able to be made into a single component, as opposed to the multiple piece construction of conventional anti-cavitation and noise-reducing devices. In addition, with the powder bed fusion processing, the traditional flow orientation of conventional anti-cavitation devices, e.g., cages, are able to be reversed from an always "flow down" orientation to include an option for a "flow-up" orientation, as also described more below.

Figure 3:
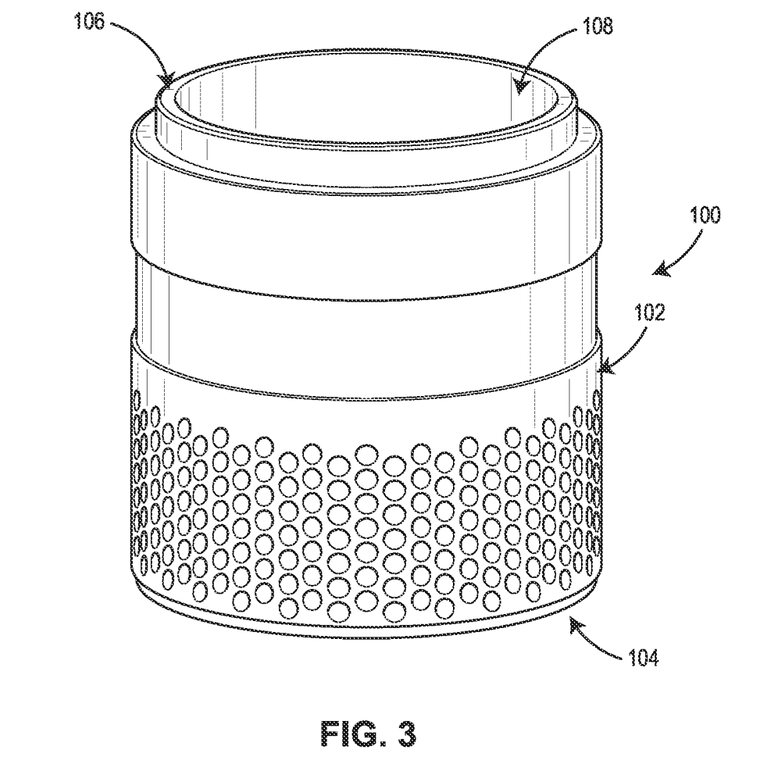
FIG. 3 is an anti-cavitation device of the present disclosure, the anti-cavitation device including a single component construction.

Referring now to FIG. 3, an anti-cavitation device 100, such as an anti-cavitation cage 100, for a valve assembly is depicted. The anti-cavitation cage 100 includes a body 102 having a first end 104 and a second end 106 disposed opposite to the first end 104. The anti-cavitation cage 100 is a single piece construction formed by at least one additive manufacturing technique, such as powder bed fusion process, as explained more below. The anti-cavitation device 100 may include a plurality of slots with various shapes that increase capacity for a maximum flow area through a passage 108 of the anti-cavitation device 100, for example. In addition, the slots may include internal lattice structures have various optional features to aid in flow performance and pressure staging, as also explained more below. Lastly, the single piece anti-cavitation device 100 may also be manufactured such that it includes various slot sizes and orientations, which also may be selected depending upon a high pressure flow of media intended, for example, and also described more below.

Figure 4A:
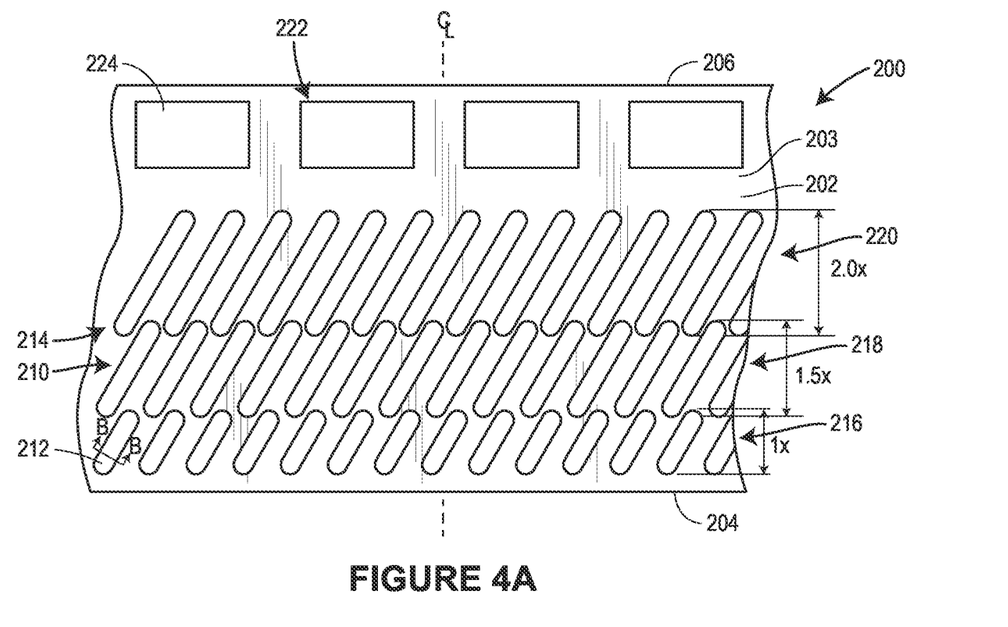
FIG. 4A is a perspective view of a portion of an exemplary anti-cavitation cage of the FIG. 3.

Referring now to FIG. 4A, the anti-cavitation device 100 may include an exemplary anti-cavitation cage 200 for a valve assembly. The anti-cavitation cage 200 includes a body 202 having an outside surface 203, a first end 204, and a second end 206 disposed opposite to the first end 204. The body 202 also include a plurality of slots 210. In one example, the plurality of slots 210 is disposed around the outside surface 203 of the body 202 of the cage 200. In addition, the anti-cavitation cage 200 is a single piece construction formed by an additive manufacturing technique, as explained more below.

In addition, the anti-cavitation cage 200 further includes a longitudinal axis L and in this example the at least one slot 212 of the plurality of slots 210 is disposed at an angle A relative to the longitudinal axis L. In one example, the angle A is less than 90 degrees and greater than zero degrees. In other examples, the at least one slot 212 may be disposed vertically relative to the longitudinal axis L or horizontally relative to the longitudinal axis L. Said another way, the at least one slot 212 may be disposed perpendicular to the longitudinal axis L or parallel to the longitudinal axis L and still fall within the scope of the present disclosure. The orientation of the at least one slot 212 or the plurality of slots 210 achieves different flow characteristics. Thus, depending upon a desired application of the anti-cavitation cage 200, a particular orientation of the plurality of slots 210 may be selected and then formed in the single piece construction of the anti-cavitation device 200 to achieve the desired flow characteristic.

Still referring to FIG. 4A, the plurality of slots 210 may further include a plurality of rows 214 including a first row 216 disposed near the first end 204 and a second row 218 disposed adjacent to the first row 216 and closer to the second end 206 than the first row 216. In addition, the plurality of rows 214 may also include a third row 220 disposed adjacent to the second row 218 and closer to the second end 206 of the body 202 of the anti-cavitation device 200. In addition, the height of the slots 212 in each of the first, second, and third rows 216, 218, and 220, respectively, may increase in size from the first row 216 to the third row 220. Said another way, the height of the slots 212 in the plurality of slots 210 may increase in size from the first end 204 to the second end 206 of the anti-cavitation cage 200. More specifically, and in this example, a height of the slots in the first row 216 is H, a height of the slots 212 in the second row 218 is 1.5H, or one and half times the height H of the first row 216, and the height of the slots 212 in the third row 220 is 2H, or twice the height H of the first row 216.

The anti-cavitation cage 200 may include a plurality of windows 222 disposed near the second end 206 of the cage 200 and around an outside surface 203 of the body 202 of the cage 200. In this example, each window 224 of the plurality of windows 222 is rectangular in shape. However, the windows 224 may alternatively be partially rectangular in shape, a quick open shape, or other shapes and still fall within the scope of the present disclosure.

Further, the at least one slot 212 of the plurality of slots 210 may be oval in shape, as depicted in FIG. 4A. Additionally and/or alternatively, the at least one slot 212 may be a rounded shape or any other shape achieving the function of the slots 212 of the plurality of slots 210 and still fall within the scope of the present disclosure. The shape of the at least one slot 212 increases the capacity for a maximum flow area through an internal passageway 208 of the cage 200. In addition, the shape of the at least one slot 212 is specific to noise attenuation features of the cage 200.

Figure 4B:
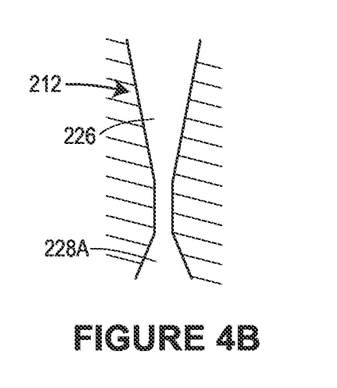
FIG. 4B is a sectional view of a portion of the anti-cavitation cage of FIG. 4A, taken along the line B-B of FIG. 4A.
Figure 4C:
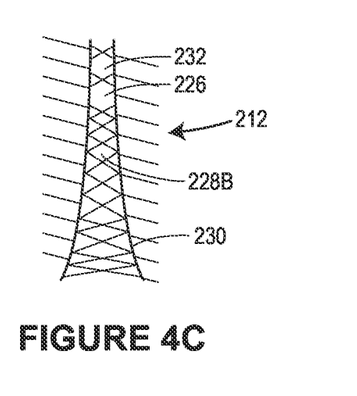
FIG. 4C is a sectional view of a portion of the anti-cavitation cage of FIG. 4A, taken along the line B-B of FIG. 4A, depicting an alternative lattice structure.

Referring now to FIGS. 4B and 4C, a cross-sectional view of at least one slot 212 of the plurality of slots 210 is depicted and taken along the line B-B of FIG. 4A. The at least one slot 212 includes an inside surface 226 having a lattice structure 228A, 228B. As depicted in FIG. 4B, the inside surface 226 may include a lattice structure 228A that is uniform in grade. Alternatively, and as depicted in FIG. 4C, the at least one slot 212 may include an inside surface 226 having a lattice structure 228B that is a graded type of lattice structure varying in density from a first portion 230 to a second portion 232. Specifically, and as depicted in FIG. 4C, the graded type of lattice structure 228B is more dense near the first portion 230 and increasingly less dense along the length of the inside surface 226 of the slot 212 to the second portion 232. So configured, the slot 212 is able to manage multiple pressure drops through a flow passageway of a valve assembly, for example, during use of the anti-cavitation cage 200.

Figure 5A:
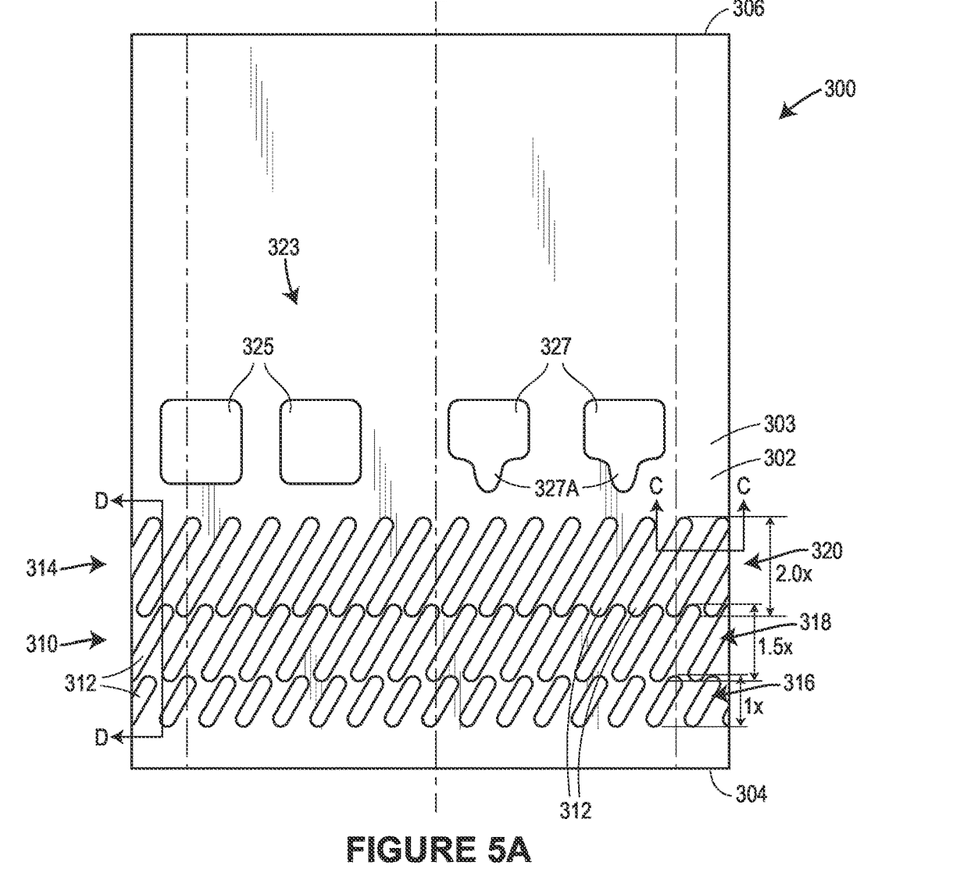
FIG. 5A is a perspective view of a portion of another exemplary anti-cavitation cage of FIG. 3.
Figure 5B:
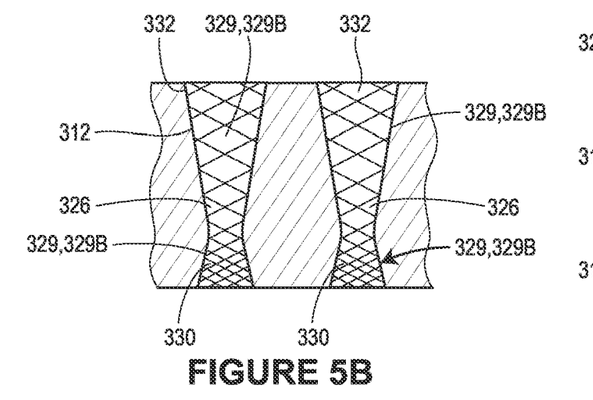
FIG. 5B is a sectional view of a portion of the anti-cavitation cage of FIG. 5A, taken along the line C-C of FIG. 5A.
Figure 5C:
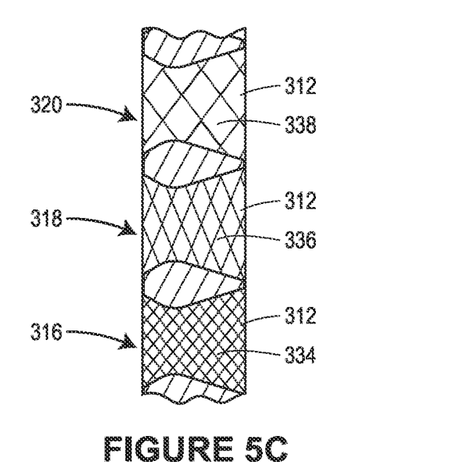
FIG. 5C is another sectional view of another portion of the anti-cavitation cage of FIG. 5A, taken along the line D-D of FIG. 5A.

Referring now to FIGS. 5A-5C, another exemplary anti-cavitation cage 300 according to the principles of the present disclosure is depicted. The anti-cavitation cage 300 is similar to the anti-cavitation cage 200 of FIGS. 4A-4C, except that the anti-cavitation cage 300 includes a different plurality of windows near a second end of a body of the anti-cavitation cage 300 and some different lattice structures inside slots of a plurality of slots, as explained more below. However, parts of the anti-cavitation cage 300 that are the same as parts of the anti-cavitation cage 200 of FIGS. 4A-4C have a reference number 100 more than the same parts of the anti-cavitation cage 200 and are not explained in detail again here for the sake of brevity.

Referring now to FIG. 5A, the anti-cavitation cage 300 includes a body 302 having an outside surface 303, a first end 304, and a second end 306. A plurality of windows 323 are disposed around the outside surface 302. The plurality of windows 323 include some windows 325 that are rectangular in shape and other windows 327 that are partially rectangular in shape and having an elongated, rounded portion 327A extending therefrom. It will be understood that the windows 325 and 327 may alternatively take the form of various other shapes and still fall within the scope of the present disclosure.

FIG. 5B depicts a cross-sectional view of two slots 312 of the plurality of slots 310 of the anti-cavitation cage 300, taken along the line C-C of FIG. 5A. As noted in FIG. 5B, the each of the slots 312 includes an inside surface 326 having a lattice structure 329 that is a graded lattice structure varying in density from a first portion 330 of each slot 312 to a second portion 332 of each slot 312. Specifically, in this example, the lattice structure 329 includes a first lattice structure portion 329A having a higher density and a second lattice structure portion 329B having a lower density, as depicted in FIG. 5B. The graded lattice structure 329 is to pressure stage media as it flows through the slots 312, for example. In addition, the graded lattice structure 329 varying in density from a first portion, e.g., the first lattice structure portion 329A, to a second portion, e.g., the second lattice structure portion 329B, is for managing multiple pressure drops through a flow passageway of a valve assembly, for example.

In another example, and as another option, the at least one slot 312 of the anti-cavitation cage 300 of FIG. 5A may include different lattice structures for each slot 312 in a row of slots. For example, and as depicted in FIG. 5C, which is a cross-sectional view of three separate slots 312 of the cage 300 taken along the line D-D of FIG. 5A, the at least one slot 312 in a first row 316 of the plurality of rows 314 of the plurality of slots 312 (see, e.g., FIG. 5A) may include a lattice structure 334 having a high density. The at least one slot 312 in a second row 318 of the plurality of rows 314 may include another lattice structure 336 having a medium density. In addition, the at least one slot 312 in a third row 320 of the plurality of rows 314 may include yet another lattice structure 338 having a light density, as depicted in FIG. 5C. While the foregoing description refers to the at least one slot 312 in each of the first, second, and third rows 316, 318, and 320, respectively, it will be understood that each slot in each of the first, second, and third rows 316, 318, and 320 may include the same lattice structures described above relative to the at least one slot 312 in each of the three rows and still fall within the scope of the present disclosure.

Thus, as FIGS. 5A and 5C illustrate, in one example, as the height of the at least one slot 312 increases along a portion of the length of the anti-cavitation cage 300 from the first end 304 to the second end 306 of the cage 300, a density of the lattice structure 334, 336, 338 of the slots 312 (e.g., the slots 312 in each row 316, 318, 320) decreases from the first end 304 to the second end 306.

Figure 6A:
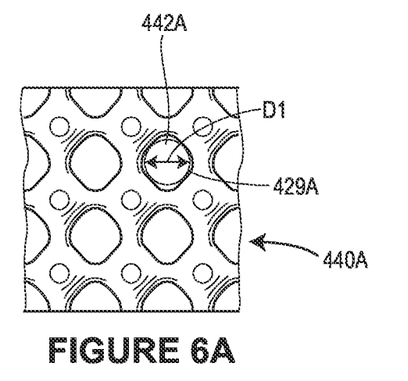
FIG. 6A is a portion of a lattice structure disposed on an inside surface of any one of the foregoing anti-cavitation cages.
Figure 6B:
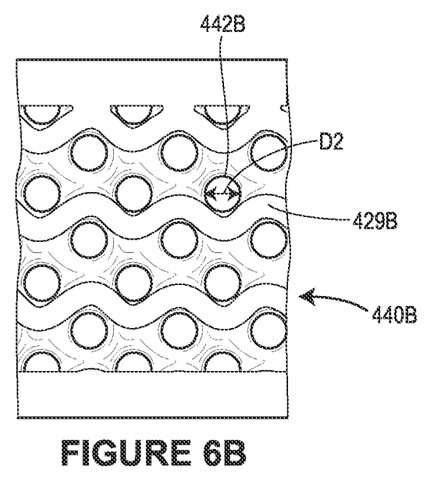
FIG. 6B is a portion of another lattice structure that may be disposed on an inside surface of any one of the foregoing anti-cavitation cages.
Figure 6C:
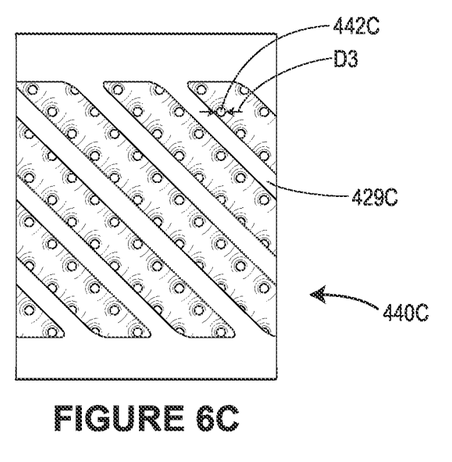
FIG. 6C is a portion of yet another lattice structure that may be disposed on an inside surface of any one of the foregoing anti-cavitation cages.

Referring now to FIGS. 6A-6C, other exemplary lattice structures that may alternatively or additionally be used on the inside of the slots 212, 312 of each of the described anti-cavitation cages 200, 300 are depicted. In particular, FIGS. 6A-6C each depict a lattice structure having a triply periodic structure with at least one round strut to aid in flow performance and pressure staging. Specifically, in FIG. 6A, a lattice structure 429A is depicted having the triply periodic structure. The lattice structure 429A includes a plurality of round struts 440A with at least one round strut 442A, each round strut 442A having a specific size and forming a pattern including a certain number of round struts depending upon the size of each round strut 442A, for example. In this example, the at least one round strut 442A has a D1, which is an outcome from volume fraction of a cell, meaning a percentage of material, such as metal material, within a specific cube size. As an example, in a 10 mm cube having a 4 mm cell, different volume fractions determine the value of D1. In this example, the value of D1 is larger than the other round struts of similar lattice structures in FIGS. 6B and 6C, as explained more below. In one example, the value of D1 may be 30% of the full volume, which may be set by defining a thickness of the cell by a ratio, for example.

More specifically, and by comparison, FIG. 6B also depicts another lattice structure 429B having a triply periodic structure with a plurality of round struts 440B having at least one round strut 442B. The at least one round strut 442B has a value D2, which is smaller than the value D1 of the at least one round strut 442A of the lattice structure 429A in FIG. 6A. Like the value D1, the value D2 is also a value corresponding to outcome from volume fraction of a cell, meaning the percentage of metal material within the specific cube size. In this example of FIG. 6B, the volume fraction has the value of D2. In one example, the value of D2 may be 20% of the full volume, which again may be set by defining a thickness of the cell by this ratio, for example.

FIG. 6C depicts another lattice structure 429C having again a triply periodic structure with a plurality of round struts 440C having at least one round strut 442C. In this case, the at least one round strut 442C has a value of D3. Like the values D1 and D2, the value D3 is also a value corresponding to outcome from volume fraction of a cell, meaning the percentage of metal material within the specific cube size. In this example, the volume fraction has the value of D3, which is smaller than the value D1 of the at least one round strut 442A of FIG. 6A and the value of D2 of the at least one round strut 442B of the lattice structure 429B in FIG. 6B. In one example, the value of D3 may be 10% the full volume, which may again be set by defining a thickness of the cell by this ratio, for example. As a result, the lattice structure 429C of FIG. 6C allows the highest number of round struts 442C in the plurality of round struts 440C, providing a very specific lattice structure for certain applications.

Thus, it will be understood that the plurality of round struts 440A, 440B, and 440C described above may include at least one round strut 442A, 442B, 442C of varying sizes. This allows various types of triply periodic structures to be included in a slot 212, 312 of the anti-cavitation cages 200, 300 described above. In each example, the plurality of round struts 440A, 440B, 440C aid in flow performance and pressure staging for the anti-cavitation cages 200, 300.

Figure 7A:
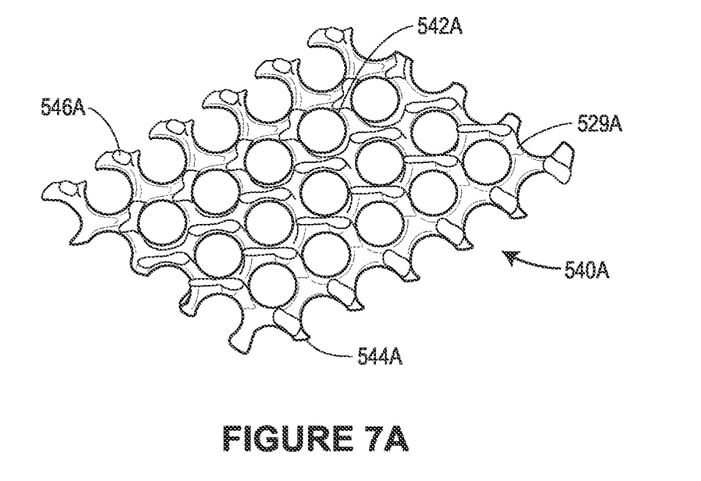
FIG. 7A is a portion of another lattice structure that may be disposed on an inside surface of any one of the foregoing anti-cavitation cages.
Figure 7B:
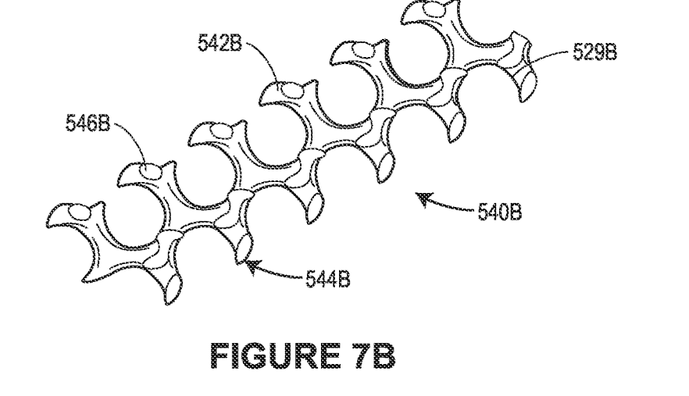
FIG. 7B is a portion of another lattice structure that may be disposed on an inside surface of any one of the foregoing anti-cavitation cages.
Figure 7C:
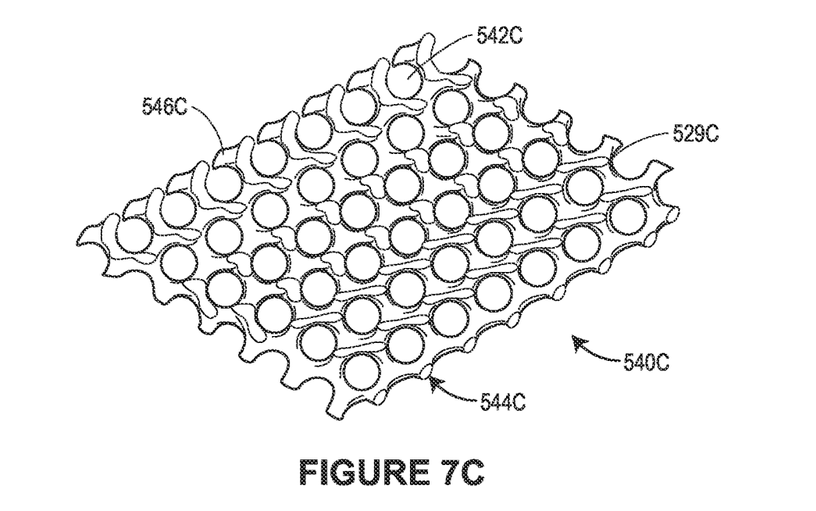
FIG. 7C is a portion of another lattice structure that may be disposed on an inside surface of any one of the foregoing anti-cavitation cages.

Referring now to FIGS. 7A-7C, other exemplary lattice structures that may alternatively or additionally be used on the inside of the slots 212, 312 of each of the described anti-cavitation cages 200, 300 are depicted. In FIG. 7A, a portion of a standard lattice structure 529A is depicted, in which there are a plurality of round struts 540A having at least one round strut 542A. In FIG. 7B, a portion of graded lattice structure 529B is depicted with only some of a plurality of round struts 540B depicted. The graded lattice structure varies in density from a first portion 544B to a second portion 546B. Specifically, the lattice structure 529B includes a density in the first portion 544B that is greater than a density in the second portion 546B. In FIG. 7C, another graded lattice structure 529C is depicted with a plurality of round struts 540C each having at least one round strut 542C. In this example, the density varies in each round strut 542C, such that the density of the round strut 542C is greater at an inner diameter than an outer diameter of the round strut 542C, for example.

Figure 7D:
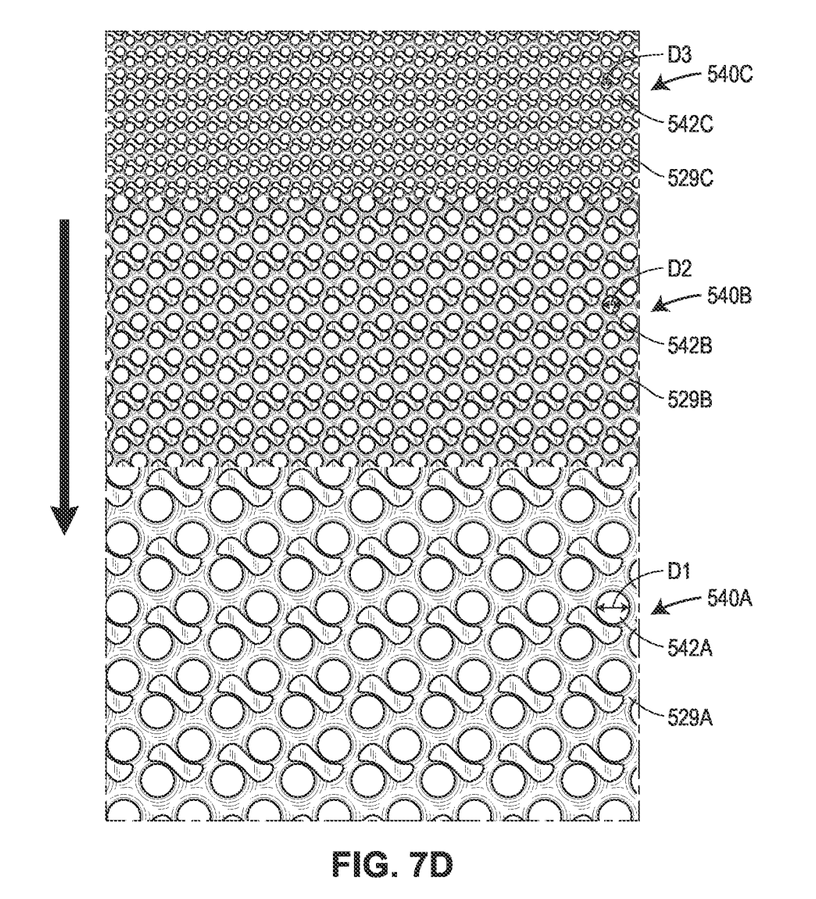
FIG. 7D is a top view of a graded lattice structure according to an aspect of the present disclosure.
Figure 7E:
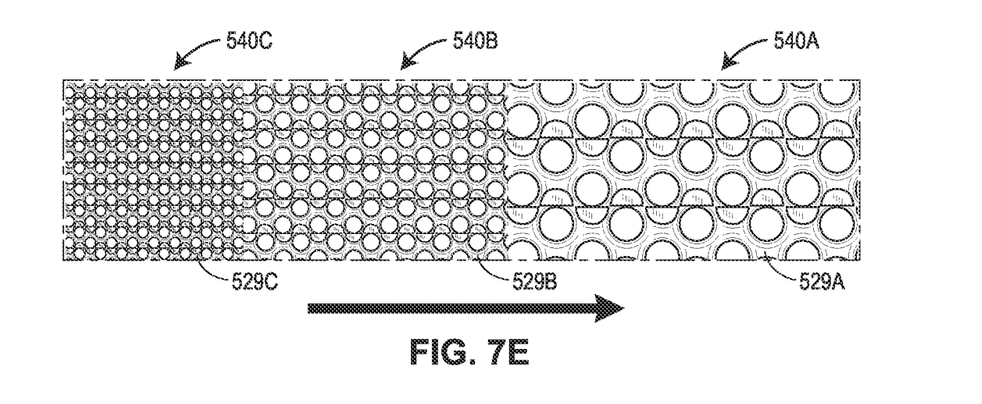
FIG. 7E is a side view of the graded lattice structure of FIG. 7D.

Referring to FIGS. 7D and 7E, top and side views, respectively, of a graded lattice structure are depicted. As depicted, the graded lattice structure includes three different cell sizes to help stage pressure as it would flow through the cage window geometry. Specifically, in this example, fluid flows through the graded lattice structure from a cell size having the greatest density to a cell size having the least density, as explained more below.

This exemplary graded lattice structure that may alternatively be used on the inside of the slots 212, 312 of each of the described anti-cavitation cages 200, 300. Specifically, in FIGS. 7D and 7E, a first lattice structure 529A is depicted and includes a plurality of round struts 540A with at least one round strut 542A, each round strut 542A having a specific size and forming a pattern including a certain number of round struts depending upon the size of each round strut 542A, for example. In this example, the at least one round strut 542A has a value D1, which is an outcome from volume fraction of a cell, meaning a percentage of material, such as metal material, within a specific cube size. As an example, in a 10 mm cube having a 4 mm cell, different volume fractions determine the value of D1. In this example, the value of D1 is again larger than the other round struts of similar lattice structures within the graded lattice structure, as explained more below. In one example, the value of D1 may be 30% of the full volume, which may be set by defining a thickness of the cell by a ratio, for example.

More specifically, and by comparison, the graded lattice structure also includes a second lattice structure 529B disposed adjacent to the first lattice structure 529A. The second lattice structure 529B has a triply periodic structure with a plurality of round struts 540B having at least one round strut 542B. The at least one round strut 542B has a value D2, which is smaller than the value D1 of the at least one round strut 542A of the first lattice structure 529A. Like the value D1, the value D2 is also a value corresponding to outcome from volume fraction of a cell, meaning the percentage of metal material within the specific cube size. In this example of FIGS. 7D and 7E, the volume fraction has the value of D2. In one example, the value of D2 may be 20% of the full volume, which again may be set by defining a thickness of the cell by this ratio, for example.

As depicted in both FIGS. 7D and 7E, the graded lattice structure includes a third lattice structure 529C adjacent to the second lattice structure 529B and again having a triply periodic structure with a plurality of round struts 540C having at least one round strut 542C. In this case, the at least one round strut 542C has a value D3. Like the values D1 and D2, the value D3 is also a value corresponding to outcome from volume fraction of a cell, meaning the percentage of metal material within the specific cube size. In this example, the volume fraction has the value of D3, which is smaller than the value D1 of the at least one round strut 542A of the first lattice structure and the value of D2 of the at least one round strut 542B of the second lattice structure 529B. In one example, the value of D3 may be 10% the full volume, which may again be set by defining a thickness of the cell by this ratio, for example. As a result, the third lattice structure 529C of FIG. 6C allows the highest number of round struts 542C in the plurality of round struts 540C, providing a very specific lattice structure for certain applications.

Figure 8:
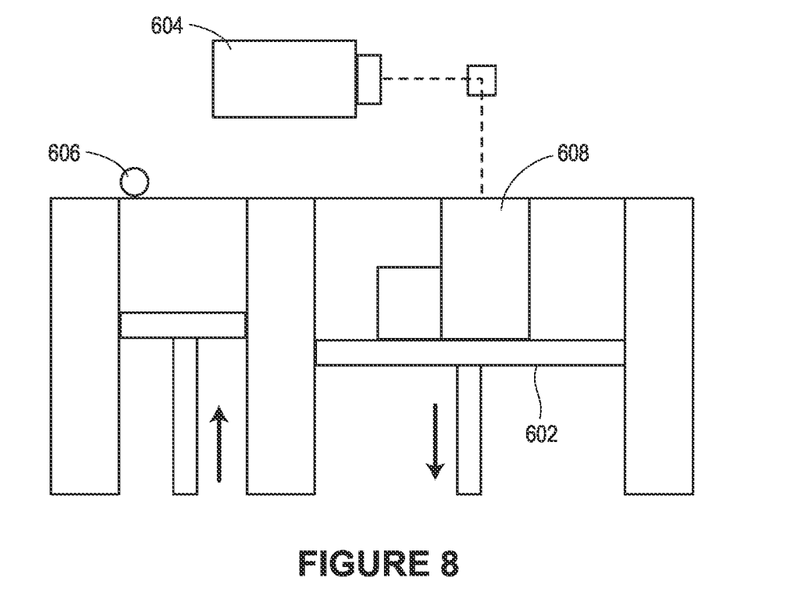
FIG. 8 is a perspective view of an exemplary additive manufacturing system that may be used with the present disclosure.

Referring now to FIG. 8, an additive manufacturing system 600 for manufacturing the anti-cavitation cages 300, 400 explained above in a single piece construction is depicted. The additive manufacturing system 600 may be a 3D printer utilizing a laser powder bed fusion process. Specifically, the system 600 includes a build platform 602, a laser 604, and a recoat mechanism 606, such as a powder roller. To manufacture an exemplary object part 608, such as the anti-cavitation cages 200, 300 in a single piece construction using the additive manufacturing system 600, a first layer of powder is spread over and/or across the build platform 602. The laser 604 then fuses the first layer of the powder of the object part 608, such as where the physical geometry is located on a two-dimensional cross-section for a first slice. A new, second layer of powder is spread across the first layer using the recoat mechanism 606, such as the roller, and the laser 604 again fuses the new layer of the powder of the object part. The process is repeated, e.g., further powder layers are added and then fused, until the entire object part, such as the anti-cavitation cage 200, 300, is created. Loose, unfused powder remains in position, but is removed during post processing using known additive manufacturing techniques commonly employed with the powder bed infusion process.

In view of the foregoing, it will be understood that that the anti-cavitation cages 300, 400 may be manufactured according to the following method. Specifically, the exemplary method includes forming a single component body 102, 202, 302 using at least one additive manufacturing technique and forming the plurality of slots 210, 310 in the body 202, 302 again using at least one additive manufacturing technique. The method also includes forming a lattice structure 228A, 228B, 329A, 329B, 334, 336, 338, 429A, 429B, 429C, 529A, 529B, 529C in an inside surface of the at least one slot 212, 312 of the plurality of slots 210, 310 using at least one additive manufacturing technique, such as the laser powder bed infusion process described above. As described above, the lattice structure may be uniform in grade through the at least one slot 212, 312 or a graded type, varying in density from the first portion 230, 330 to the second portion 232, 332 of the slot 212, 312, for example.

In another example, the method may further comprise reversing a flow orientation of the body 202, 302 of the anti-cavitation cage 200, 300 from a flow-down orientation to include an option for a flow-up orientation. In addition, in another example, forming the plurality of slots 210, 310 in the body 202, 302 using at least one additive manufacturing technique comprises forming the plurality of slots 210, 310 including a plurality of rows 214, 314 having a first row 216, 316 disposed near a first end 204, 304 of the body 202, 302, a second row 218, 318 disposed adjacent to the first row 216, 316 and closer to a second end 206, 306 of the body 202, 302 than the first row 216, 316, and a third row 220, 320 disposed adjacent to the second row 218, 318 and closer to the second end 206, 306 than the first and second rows 216, 316, 218, 318. A height of the slots 212, 312 in each of the first, second, and third rows increases in size from the first end 204, 304 to the second end 206, 306 of the body 202, 302. Additionally, the height of the slots 212, 312 in the first row is H, the height of the slots 212, 312 in the second row is 1.5H, and the height of the slots 212, 312 in the third row 2.0H.

Further, in another example, forming the lattice structure in the inside surface of at least one slot 212, 312 of the plurality of slots 210, 310 using at least one additive manufacturing technique comprises forming a lattice structure 429A, 429B, 429C having a triply periodic structure having a plurality of round struts 440A, 440B, 440C, the round struts 442A, 442B, 442C aiding in flow performance and pressure staging. In some examples, the method may further include forming a plurality of windows 223, 323 near the second end 206, 306 of the body 202, 302 using an additive manufacturing technique.

In view of the foregoing, it will be appreciated that the anti-cavitation cages 200, 300 and method of manufacturing the same include several advantages. For example, additive manufacturing, such as the laser powder bed fusion process, simplifies the creation of the complex shapes of the anti-cavitation cages 200, 300. In addition, using additive manufacturing allows the consolidation of multiple pieces of the conventional anti-cavitation cages and devices into a single piece construction, as explained above. Producing complex shapes and reducing the total number of components reduces the cost in manufacturing, assembly, and material.

The figures and description provided herein depict and describe preferred embodiments of an anti-cavitation cage and a method of manufacturing an anti-cavitation cage for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. An anti-cavitation cage for a valve assembly, the anti-cavitation cage comprising:
a body having a plurality of slots, a first end, a second end, and at least one slot of the plurality of slots including an inside surface having a lattice structure, the lattice structure within the inside surface of the at least one slot and one of uniform in grade through the at least one slot or a graded type varying in density from a first portion to a second portion of the at least one slot, the graded type of lattice structure of the inside surface of the at least one slot varying in density from the first portion to the second portion and is configured to manage multiple pressure drops through a flow passageway of the valve assembly;
wherein the anti-cavitation cage is a single component, and the plurality of slots includes a plurality of rows including a first row disposed near a first end, a second row disposed immediately adjacent to the first row, and a third row disposed immediately adjacent to the second row, a height of the slots in each of the first, second and third rows increases in size from the first row to the second row and to the third row, and each row of the plurality of rows overlapping at least one other row of the plurality of rows.

2. The anti-cavitation cage of claim 1, further comprising a longitudinal axis, wherein the at least one slot of the plurality of slots is disposed one of vertically along a longitudinal axis of the anti-cavitation cage, at an angle from the longitudinal axis of the anti-cavitation cage, or horizontally from the longitudinal axis of the anti-cavitation cage, the orientation of the at least one slot to achieve different flow characteristics.

3. The anti-cavitation cage of claim 1, wherein the height of the slots in the first row is H, the height of the slots in the second row is 1.5H, and the height of the slots in the third row is 2H.

4. The anti-cavitation cage of claim 1, wherein the height of the slots of the plurality of slots increase in size from the first end to the second end of the cage.

5. The anti-cavitation cage of claim 1, the anti-cavitation cage including a plurality of windows disposed at the second end of the cage, wherein at least one window may include any one or more of a rectangular shape, a partially rectangular shape or a quick open shape.

6. The anti-cavitation cage of claim 1, where at least one slot of the plurality of slots includes one or more of an oval shaped, an elongated oval shape, or a rounded shape, the shape of the at least one slot one or more of: (1) increasing capacity for a maximum flow area through a passageway of the cage; or (2) specific to noise attenuation.

7. The anti-cavitation cage of claim 1, the lattice structure comprising a triply periodic structure comprising a plurality of round struts, the plurality of round struts to aid in flow performance and pressure staging.

8. The anti-cavitation cage of claim 1, wherein as a height of the at least one slot of the plurality of slots increases along a portion of the length of the cage from the first end to the second end of the cage, a density of the lattice structure of the slots decreases from the first end to the second end of the cage.

9. The anti-cavitation cage of claim 1, wherein the anti-cavitation cage is formed of a single component by at least one additive manufacturing technique, and the at least one additive manufacturing technique comprises a powder bed fusion process.

* * * * *

UNITED STATES PATENT AND TRADEMARK OFFICE
CERTIFICATE OF CORRECTION

| | | |
|---|---|---|
| PATENT NO. | : 12,078,264 B2 | Page 1 of 2 |
| APPLICATION NO. | : 17/332560 | |
| DATED | : September 3, 2024 | |
| INVENTOR(S) | : Thomas N. Gabriel et al. | |

It is certified that error appears in the above-identified patent and that said Letters Patent is hereby corrected as shown below:

On the Title Page

Item (72), Line 4, "Julian." should be -- Julian --.

Item (72), Line 7, "A." should be -- Allen --.

In the Specification

At Column 1, Line 43, "if sufficient" should be -- is sufficient --

At Column 4, Line 30, "1B is graph" should be -- 1B is a graph --.

At Column 5, Line 42, "have" should be -- having --.

At Column 8, Line 51, "10%" should be -- 10% of --.

At Column 10, Line 6, "10%" should be -- 10% of --.

At Column 10, Line 37, "that that" should be -- that --.

At Column 11, Line 7, "2.0H." should be -- is 2.0H. --.

In the Claims

At Column 12, Line 32, "claim 1, the" should be -- claim 1, wherein the --.

At Column 12, Line 37, "where" should be -- wherein --.

Signed and Sealed this
Fourteenth Day of October, 2025

John A. Squires
*Director of the United States Patent and Trademark Office*

At Column 12, Line 39, "slot one" should be -- slot may be one --.

At Column 12, Line 43, "claim 1, the" should be -- claim 1, wherein the --.